United States Patent [19]

Fleemin

[11] Patent Number: 4,490,931
[45] Date of Patent: Jan. 1, 1985

[54] DISPLAY DEVICE AND METHOD

[76] Inventor: Joseph D. Fleemin, G.P.O. Box 1700, New York, N.Y. 10116

[21] Appl. No.: 416,216

[22] Filed: Sep. 9, 1982

Related U.S. Application Data

[63] Continuation-in-part of Ser. No. 330,032, Dec. 11, 1981, abandoned.

[51] Int. Cl.³ .............................................. G09F 19/00
[52] U.S. Cl. ........................................ 40/406; 40/409; 40/430; 40/431; 40/440; 40/441
[58] Field of Search ................. 40/406, 538, 407, 539, 40/409, 160, 412, 422, 430, 431, 439, 440, 441; 428/13, 14, 15, 17, 27; 46/91; 119/5, 3; 47/69

[56] References Cited

U.S. PATENT DOCUMENTS

| Re. 28,116 | 8/1974  | Cohen ........................................ 119/5 |
| 1,677,450  | 7/1928  | Iden .......................................... 40/326 |
| D. 175,472 | 8/1955  | Kotzin. Sr. ............................... D26/64 |
| 1,741,692  | 12/1929 | Garaja ....................................... 47/69 |
| 2,836,912  | 6/1958  | Ranucci ................................... 40/430 |
| 3,118,424  | 1/1964  | Willinger ................................. 119/5 |
| 3,265,388  | 8/1966  | Kane ........................................ 119/5 |
| 3,535,805  | 10/1970 | Peiperl .................................... 40/406 |
| 3,563,204  | 2/1971  | Szilagyi ................................... 40/406 |
| 3,921,584  | 11/1975 | Scantlin ................................... 119/5 |
| 3,975,845  | 8/1976  | Mellard ................................... 40/430 |
| 4,171,681  | 10/1979 | Berger et al. ........................... 119/3 |
| 4,240,218  | 12/1980 | Kotzin .................................... 40/439 |

Primary Examiner—Robert Peshock
Assistant Examiner—Cary E. Stone
Attorney, Agent, or Firm—Florence U. Reynolds

[57] ABSTRACT

Biological material, such as a natural plant, is displayed within a transparent casing containing a preserving liquid which may consist at least partially of isopropyl alcohol. The material is attached either to a float or to a swivel anchor or to both so that, regardless of its weight, it is controllably suspended submerged in the liquid. The material is connected to the float or anchor, preferably by plastic threads substantially invisible in the liquid. The liquid in the casing is caused to move so that the biological material will rotate and afford a noticeable and aesthetic display. Music in conjunction with the rotation of the biological material may also be provided, as well as a light source for illuminating the display.

23 Claims, 8 Drawing Figures

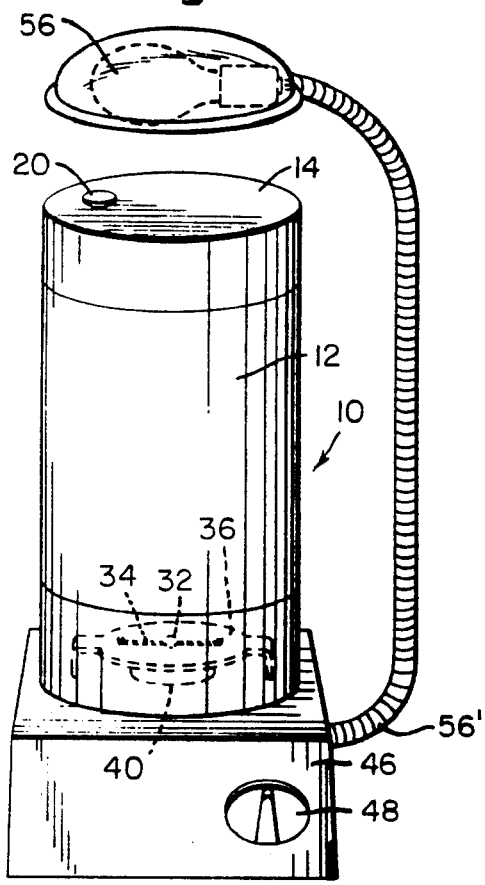
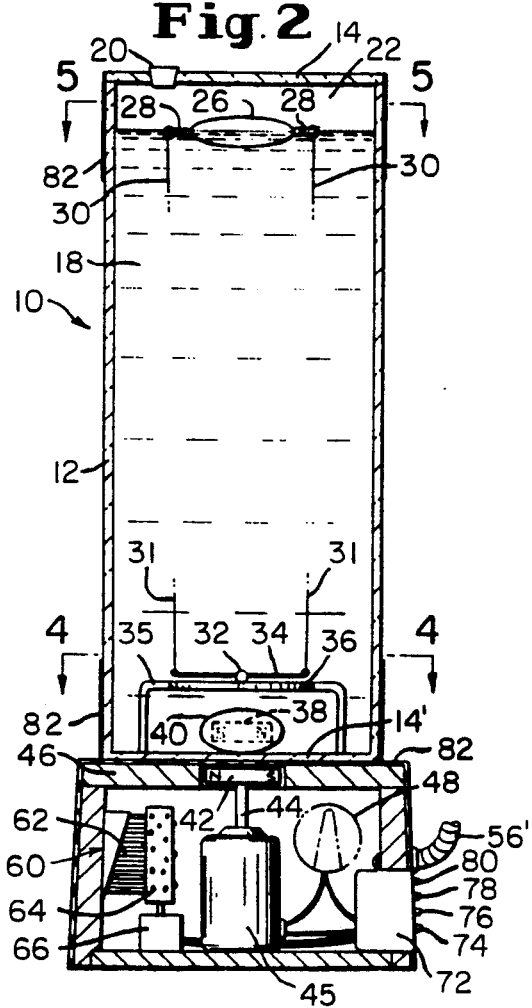
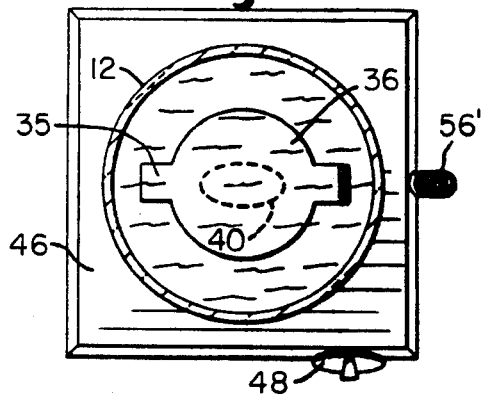
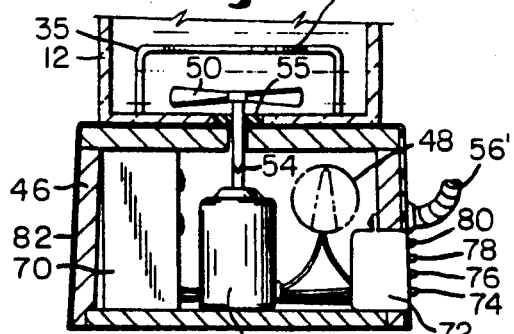
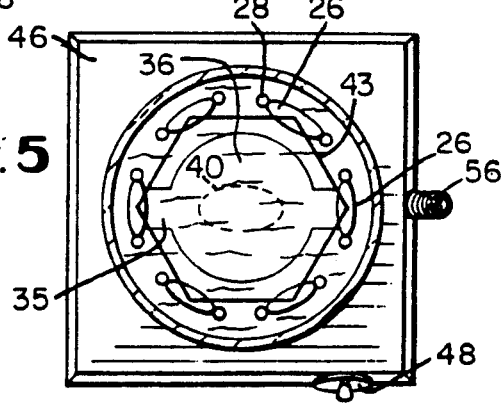

4,490,931

1

DISPLAY DEVICE AND METHOD

CROSS REFERENCE TO RELATED APPLICATION

This is a continuation-in-part application of Ser. No. 330.032 filed Dec. 11, 1981 now abandoned.

BACKGROUND OF THE INVENTION

The present invention is directed to the provision of a device and method for displaying biological materials, such as plants, which are to be viewed in a preserved state. It is important for teachers, botanists, store owners, home owners, and others, to be able to display materials, such as rare plants, in a container without worrying about the preservation of the material, and to display the material in a fashionable and attractive way which will attract notice and interest.

Display devices are known in the art for displaying articles needed to be preserved, in which a solution of alcohol and water is provided to preserve the material. However, such prior art units are relatively unattractive. Display devices are also known in other arts where, for example, lighting effects are to be achieved.

U.S. Pat. No. 3,535,805 provides for display of various shaped birefringent sheet forms freely suspended in a rotating liquid. Light is directed onto the forms and polarizing filters are located on opposite sides of the forms and in the path of light. Means are provided to rotate the liquid, thus causing the suspended forms to move and to provide a moving image on a wall or screen. However, this arrangement would not be suitable for the display of biological materials. It is complicated and cumbersome and is for enjoyment only. It has no educational value.

SUMMARY OF THE INVENTION

It is, therefore, the primary object of the present invention to provide a device and method for displaying biological materials, such as plants, which display is attractive and structured to excite aesthetic interest.

It is another object of the present invention to provide such a device that is easily viewed and which is relatively simple and inexpensive in construction.

It is another object of the invention to make possible shipping and receiving of biological materials, such as plant or animal material, by using relatively inexpensive and easily obtainable isopropyl alcohol, (rubbing alcohol), as a preservative, thereby releasing said materials from many regulatory shipping or sales limitations applied to living, edible, or other organic items.

A further object of the invention is that the clarity of view through the container is not adversely affected by any reaction with the fluid used, even over long-term years of contact.

A further object is that the end product container, and its contents, (not including the external, motor-driven elements), have a very long, trouble-free life expectancy, (barring damage through misuse or mistreatment).

It is a further object of the invention to emphasize the centuries-long mystique surrounding certain plants, or plant parts, with the relatively silent, unseen means of motion provided.

It is still another object of the present invention to provide a device that is readily and easily handled and set up.

To these ends, the display device and method of the present invention provide a transparent casing with a hollow interior, in which is provided a preserving liquid, such as isopropyl alcohol. The surface of the liquid is provided with one or more floats which float on the surface of the liquid. The floats are connected to the displayed biological material by at least one, but preferably more than one, very thin plastic threads which are substantially invisible in the liquid. When the liquid is stirred by a means at the bottom of the casing, the float moves and causes the attached materials to rotate in accordance with the movement of the liquid in the hollow interior of the casing.

For displayed materials that would float, a rotatable anchor mounted to the bottom of the casing is used, connected to the displayed material by threads.

For more exact arrangements of displayed materials, both floats and an anchor are used together, connected by threads, and the displayed material is attached to these threads.

The stirring means may be, in the preferred form of the invention, a magnetized, plastic encased bar, freely rotating at the bottom of the casing, which bar is in turn rotated by a bar magnet rotatably driven by a motor housed in a stationary housing below the bottom surface of the casing. Alternatively, the stirring means may be a propeller within the casing adjacent the bottom thereof, which propeller is driven by a motor, connected to the propeller by a clutch mechanism. A further alternative stirring means comprises a circuit of tubing having one or more angled inlets and an outlet communicating with the interior of the casing and a motor driven pump connected in the tubing circuit so that the liquid circulates through the tubing. The liquid exiting from the angled inlet or inlets into the interior of the liquid-filled casing causes the liquid to rotate.

The casing itself is made of a transparent plastic material, such as an acrylic plastic, while the bottom surface thereof and an optional top cover portion may be made of translucent material, so that when a lamp positioned above the top cover portion illuminates the top cover portion, the light is diffused through the interior of the casing, and light from a lamp positioned under the bottom surface would also be diffused through the interior of the casing. An enclosure or opaque linings are also provided around the circumferential portions of the casing adjacent the top and bottom thereof, as well as around the housing for the motor or pump, so that the moving parts and floats are not visible by a viewer.

The housing for the motor means is also provided, in the preferred form of the invention, with a music source, such as a tape deck, and a rheostat that variably controls the rate of motor operation and, therefore, the speed of stirring. An electrical control switch means is provided that controls the operation of the motor means, the music source, and the light source.

BRIEF DESCRIPTION OF THE DRAWINGS

The invention will be more readily understood with reference to the accompanying drawings wherein FIG. 1 is a side perspective view of the display device of the present invention;

FIG. 2 is a side sectional view of the display device of the present invention showing the structure of the elements therein;

FIG. 3 is a side sectional view of a portion of the casing showing another embodiment of the liquid-rotation means of the present invention;

FIG. 4 is a cross sectional view taken along line 4—4 of FIG. 2;

FIG. 5 is a cross sectional view taken along line 5—5 of FIG. 2;

DETAILED DESCRIPTION

Figure 6:
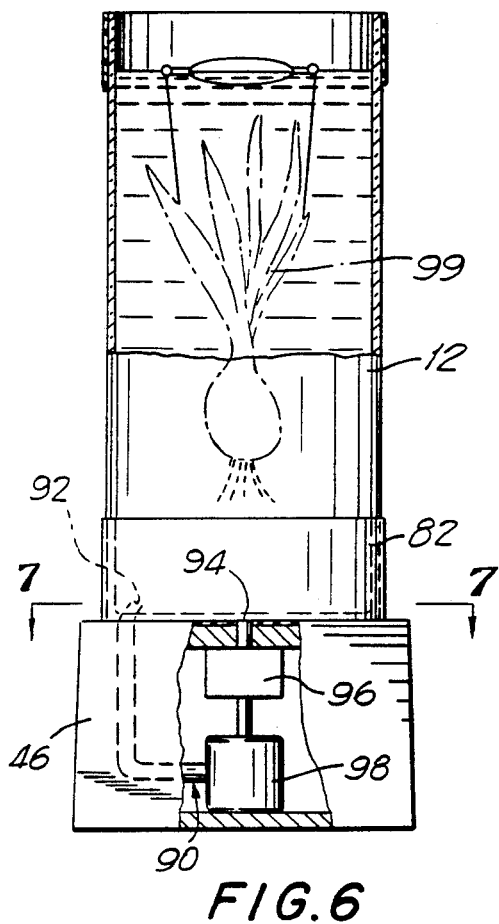
FIG. 6 is a side sectional view, partially broken away, showing another embodiment of the liquid-rotation means.
Figure 7:
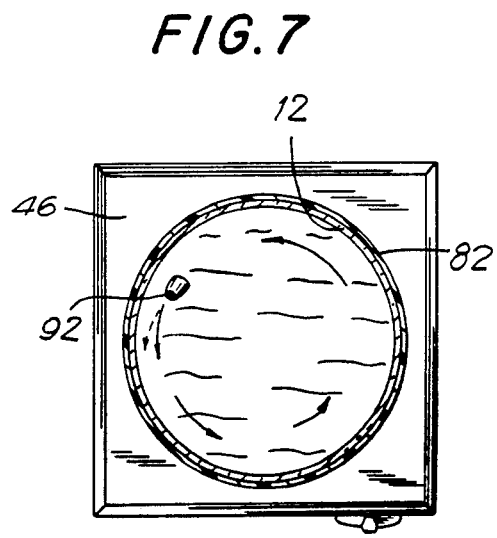
FIG. 7 is a cross sectional view taken along line 7—7 of FIG. 6.

Referring now to the drawings, the display device for biological material is indicated generally by reference numeral 10. The display device of the present invention is made of a transparent casing 12, preferably cylindrical in shape, though other configurations may be provided. The casing 12 may have a top translucent cover portion 14, which is cemented to the rest of the container after a preserving liquid 18 and materials to be displayed are supplied in the hollow interior of the casing. A removable stopper may be used to remove or add liquid in the hollow interior. The liquid, which consists preferably of 40% isopropyl alcohol and 60% water and which acts as a preserving liquid for biological material, is filled within the casing, so as to define an air space 22 between the top surface of the liquid and the top of the cover portion or any enclosure around the top portion of the casing.

Floated upon the top surface of the liquid, is at least one float 26, which float stays upon the top surface of the liquid at all times. In FIG. 5, there are shown a plurality of such floats 26, connected by wires 43, which are arrayed in a circular configuration on the surface of the liquid. Each float 26 is provided with a pair of oppositely extending flanges 28, each of which is affixed to a connecting thread 30, which connecting threads 30 extend downwardly through the preserving liquid for attachment to the material to be displayed. The rotatable anchor 32 is of standard construction and well-known in the art, and is typical to one used in attaching rotating lures in fishing. Each thread 31 is affixed to the anchor via wires 34 extending from a respective side of the anchor, as clearly shown in FIG. 2, and each thread extends upward for attachment to the material to be displayed.

The anchor 32 is preferably mounted upon a U-shaped shield 36, which shield is attached to the lower interior surface of the casing by projections 35, as shown in FIG. 4. The shield 36 protects, from view, a liquid stirring means mounted or resting adjacent the lower interior surface of the casing. The liquid stirring means is made up of, in one preferred form of the invention, a magnetized bar 38 encased within a plastic housing 40, the housing protecting the bar from contact with the liquid, and making silent rotation possible.

In FIG. 2, there is shown the driving means for rotating the magnetized bar 38, which driving means has a magnet 42 fixedly connected to a motor drive shaft 44 for rotation therewith, upon actuation of the motor 45. The motor and magnet are provided within a housing 46 attached to the lower outer surface of the casing 12. Appropriate electrical control means are also provided and include a rheostat 48 which controls the speed of the motor, and thereby the rate of stirring of the liquid in the casing.

In FIG. 3, an alternative form of stirring the liquid is shown in which a propeller 50 is rotated by a motor 52 via clutch 54. A seal 55 is provided to prevent escape of the liquid from the interior of the casing.

Figure 8:
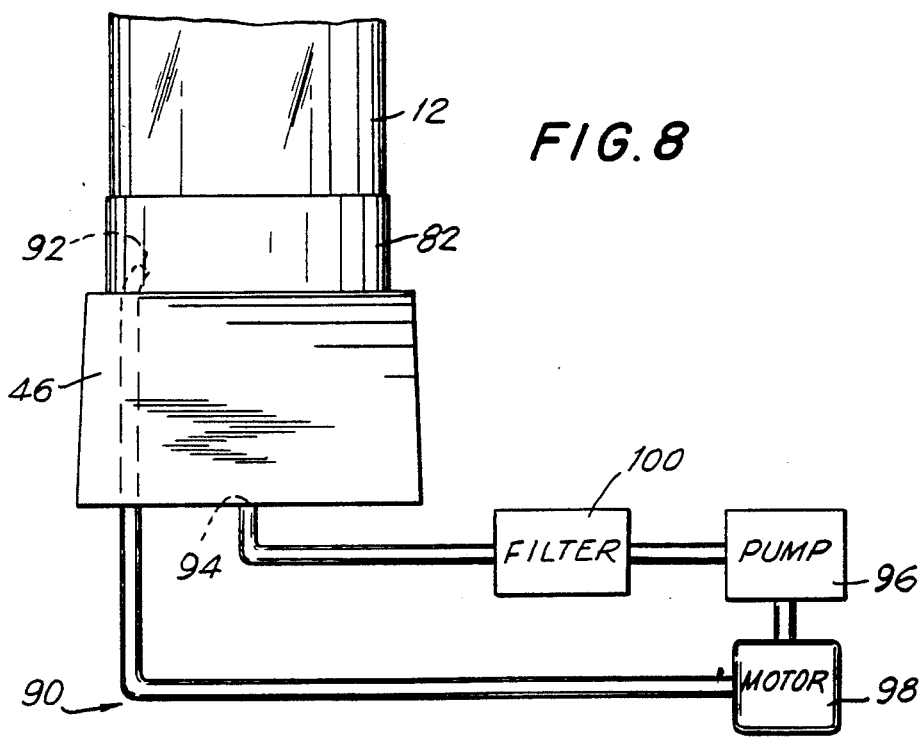
FIG. 8 is a schematic diagram of an alternative arrangement of the embodiment of FIG. 6.

In FIG. 6, another preferred alternative form of stirring the liquid is shown in which a tubing circuit 90 has an angled inlet 92 and an outlet 94 which communicate with the liquid 18 in the interior of the casing 12. The liquid 18 is propelled through the tubing circuit 90 by means of an in-line pump 96 driven by motor 98. The jet of liquid emerging from angled inlet 92 causes rotation of the liquid and consequently of the material 99 to be displayed. As shown in FIG. 8, a filter 100 is positioned within the tubing circuit to filter out any extraneous material in the liquid. Also the pump and motor may be located remotely from the display itself to provide more silent operation.

To provide the best viewing and aesthethic effect for the display device of the present invention, a gooseneck lamp 56 is provided having one end 56' connected to the housing 46, while the socket end is positioned above the top cover portion 14, so that the light from the lamp will illuminate the interior of the casing and, therefore, the materials presented for display. Further, within the housing 46, there is provided a music box 60 having a music box drum 62 and musical tines 64, which musical tines are rotated by a gear motor 66. Alternatively, the music may be supplied via a tape playing unit 70 shown in FIG. 3.

The lamp, music source, and liquid stirring means are all controlled via a switch box 72 with contacts 74, 76 and 78 for the three units, and one master control switch 80.

To prevent viewing of the floats 26 and the driving structure within the housing 46, layers of opaque material are provided around the housing 46 and around the circumferential portions of the top cover portion 14 and lower portion 14'. This opaque material 82 will shut out viewing of these elements by blocking the light from passing therethrough.

The casing, floats and shield are all preferably made of plastic, with the casing being made of a clear plastic, such as acrylic. The music source and lamp are preferably coordinated with the rotation rate of the preserving liquid to afford a maximum effect. Typically, the casing wall is ⅛ inch in thickness or more, but too great a thickness is not desirable due to the distortion caused by the refraction of the light therethrough. The top cover portion, as well as the lower surface 14' of the casing may be translucent to provide unique lighting effects, as by using colored lights.

While specific embodiments of the invention have been shown and described, it is to be understood that numerous changes and modifications may be made therein without departing from the scope and spirit of the invention as set out in the appended claims.

What is claimed is:

1. A display device for natural biological material comprising a transparent casing having a hollow interior, said transparent casing having vertical walls and a lower surface which define therebetween said hollow interior; a preserving liquid filling said hollow interior; at least one float means on the surface of the liquid for positioning said biological material submerged in said liquid; connecting means attached to and extending from said float means; first means in said casing the lower surface thereof for causing said liquid to rotate in said hollow interior; and second means for driving said first means; whereby biological material may be attached to said connecting means, and the motion of said liquid causes the display material to move within said liquid.

2. The display device according to claim 1, further comprising a swivel anchor connected to said float means by said connecting means, such that said connecting means extends from the surface of the liquid downwardly through the liquid to adjacent said lower surface of said casing.

3. The display device according to claim 2, wherein said float means comprises at least one float, and said connecting means comprises at least one substantially invisible plastic thread tying said float to said swivel anchor.

4. The display device according to claim 2, further comprising at least two arms projecting from said anchor and wherein said connecting means comrprises a plurality of substantially invisible plastic threads, at least one said thread connecting one side edge of said float to one of said arms, and at least one other thread connecting the other side edge of said float to the other arm, whereby when said liquid is rotated within said hollow interior, said plurality of threads rotate about said swivel anchor, with said swivel anchor as the rotating center of the orbits of said threads.

5. The display device according to claim 1, wherein said connecting means comprises at least one substantially invisible plastic thread.

6. The display device according to claim 1 or 2, wherein said first means comprises a magnetized bar, and means for rotatably mounting said magnetized bar on said lower surface of said casing; and said second means comprises a rotatable magnet in close proximity to said magnetized bar, and motor means for rotatably driving said rotatable magnet, said second means further having a housing for enclosing therein said motor means and said rotatable magnet, said housing being affixed to the outside of said lower surface of said casing; said second means further comprising electrical control means for controlling the speed and operation of said motor means and thereby the rate of stirring of said liquid within said hollow interior.

7. The display device according to claim 1 or 2, wherein said first means comprises a rotatable propeller rotatably mounted with said hollow interior and having a drive shaft extending through said lower surface of said casing; and said second means comprises motor means having a driving shaft connected to said drive shaft at a point below and outside of said lower surface of said casing, said second means further comprising a housing for encasing said motor means therein, and electrical control means for controlling the operation and speed of said motor means and therefore of said propeller.

8. The display device according to claim 1 or 2, wherein said first means comprises at least one angled inlet opening into the hollow interior of said casing in the lower portion thereof, an outlet opening out of said casing in the lower portion thereof and a tubing circuit connecting said inlet and said outlet; and said second means comprises a pump connected in said tubing circuit for circulating said liquid from said casing through said outlet into said tubing circuit and out of said inlet, thus producing an angled stream of liquid which causes rotating motion of said liquid within said casing.

9. The display device according to claim 8, further comprising a filter connected in said tubing circuit to filter out any extraneous material within said liquid.

10. The display device according to claim 1, wherein said casing further comprises a top cover portion at least initially removable from the rest of said casing, said top cover portion defining said upper surface of said casing and having an opening formed therethrough, and a stopper for tight fitting in said opening, said opening allowing for the provision of said liquid in said hollow interior.

11. The display device according to claim 1 or 2, wherein said casing further comprises a shield mounted on the interior of said lower surface, said shield covering said first means such that said first means are not observable from the top of said casing; said swivel anchor being mounted on said shield.

12. The display device according to claim 1 or 2, wherein said float means comprises a plurality of floats, said plurality of floats being connected to each other upon the surface of said liquid in a circular-type arrangement, whereby when said liquid is caused to rotate by said first and second means, said plurality of floats will rotate therewith.

13. The display device according to claim 1 or 2, further comprising biological material attached to said connecting means and wherein said liquid comprises isopropyl alcohol for preserving said biological material therein.

14. The display device according to claim 1, further comprising a lamp projecting its light on the surface of said liquid to illuminate the interior of said casing.

15. The display device according to claim 1, further comprising means for supplying music as said liquid and therefore the biological material rotates in said casing, said means for supplying music being mounted within said housing of said second means.

16. The display device according to claim 15, wherein said means for supplying music comprises a music-box drum and musical tines, and further comprising a gear-motor means driving said musical tines.

17. The display device according to claim 15, wherein said means for supplying music comprises a tape unit mounted in said housing of said second means.

18. The display device according to claim 15, further comprising electrical control means for controlling the operation of said second means and the operation of said means for supplying music.

19. The display device according to claim 1, further comprising natural plant material attached to said connecting means and wherein said liquid comprises a preservative liquid for said plant material.

20. A method for displaying natural biological material in a container of liquid which acts as a preservative for said biological material, comprising the steps of suspending said biological material submerged in said liquid from a float on the surface of the liquid by substantially invisible plastic connecting means, and producing rotating motion of said liquid in said container by substantially silent means, thereby imparting movement to said biological material.

21. The method according to claim 20, further comprising the step of continuously filtering said liquid for maintaining clarity of the liquid.

22. The method according to claim 20, further comprising illuminating said container and said biological material.

23. The method according to claim 20, further comprising the step of supplying music whose rhythm coincides with the movement of the biological material.

* * * * *